United States Patent [19]

Hammer et al.

[11] 3,920,868
[45] Nov. 18, 1975

[54] PROCESS FOR THE MANUFACTURE OF A CHEMICALLY BONDED NON-WOVEN FIBER MATERIAL IN SHEET FORM

[75] Inventors: Klaus Hammer, Mainz; Herbert Porrmann, Konigshofen; Klaus Jürgen Lucas, Hallgarten, all of Germany

[73] Assignee: Hoechst Aktiengesellschaft, Germany

[22] Filed: Oct. 19, 1972

[21] Appl. No.: 298,935

[30] Foreign Application Priority Data
Oct. 22, 1971  Germany............................ 2152596

[52] U.S. Cl. ............... 427/354; 427/390; 427/394; 427/381
[51] Int. Cl.² ........................................... C08J 7/08
[58] Field of Search ..... 117/140 A, 161 LN, 161 A, 117/161 F, 11, 63

[56] References Cited
UNITED STATES PATENTS

| | | | |
|---|---|---|---|
| 2,765,287 | 10/1956 | Aycock................ | 117/140 |
| 2,912,350 | 11/1959 | Videen et al. ........ | 117/140 |
| 2,982,682 | 5/1961 | Matlin et al. ........ | 117/161 X |
| 3,081,197 | 3/1963 | Adelman.............. | 117/140 |
| 3,137,589 | 6/1964 | Reinhard et al. .... | 117/140 |
| 3,185,582 | 5/1965 | Alegre ................. | 117/140 |
| 3,224,991 | 12/1965 | Wilfert................ | 117/161 X |
| 3,278,561 | 10/1966 | Gaertner............. | 117/135.5 |
| 3,380,851 | 4/1968 | Lindemann et al. . | 117/140 |
| 3,459,698 | 8/1969 | Mantell et al....... | 117/140 X |
| 3,594,337 | 7/1971 | Shea ................... | 161/170 X |
| 3,791,849 | 2/1974 | Hammer et al...... | 117/140 X |

FOREIGN PATENTS OR APPLICATIONS

| | | | |
|---|---|---|---|
| 547,101 | 10/1957 | Canada................. | 117/63 |
| 826,570 | 1/1960 | United Kingdom... | 117/63 |
| 894,803 | 4/1962 | United Kingdom... | 117/140 |

Primary Examiner—Cameron K. Weiffenbach
Assistant Examiner—Ralph E. Varndell
Attorney, Agent, or Firm—James E. Bryan

[57] ABSTRACT

This invention relates to a process for the manufacture of a chemically bonded non-woven fiber material in sheet form which comprises incorporating with a base material a binder liquid containing, in an aqueous medium, a synthetic thermoplastic elastomer, a soluble filler, a hydrophilic chemical substance with free OH groups, a reactive fat-like hydrophobic compound with 10 to 24 carbon atoms in the molecular chain, and a crosslinking agent, freeing said base material from excess binder liquid, coagulating the retained polymeric binder, heating said resulting material to a temperature and for a time sufficient to crosslink said modifying constituents in said base material, and washing and drying the resulting material.

16 Claims, No Drawings

PROCESS FOR THE MANUFACTURE OF A CHEMICALLY BONDED NON-WOVEN FIBER MATERIAL IN SHEET FORM

This invention relates to a process for the manufacture of a chemically bonded non-woven fiber material in sheet form.

Chemically bonded random fiber fleeces, in which the polymeric binder is incorporated in the form of compact layers in the fleece, are used as supports for the manufacture of synthetic materials with leather-like properties. According to a known process, the base support material is impregnated with an elastomer dispersion or solution and thereafter the polymer is coagulated in the fleece by heat. While the bonded fleeces manufactured according to the known process possess satisfactory mechanical properties they do not fulfill the requirements that such materials have to meet as regards physiological properties. The latter include, above all, water vapor absorbency, water-repellent effect and air and water vapor permeability.

It has not been possible hitherto, by known processes, to achieve a high water vapor absorbency by the use of so-called hydrophilic chemical binders, since on precipitation of the polymers, the latter are deposited in the fleece in compact layers and the copolymerized hydrophilic groups of the polymer are then no longer accessible in sufficient number to bind the water vapor. The use, or use in conjunction, of natural or regenerated fibers in the fleece also does not give rise to the desired water vapor absorbency because the binder is particularly strongly absorbed on these fibers and encases them, and in this way also makes them inaccessible to the water vapor. A further property of natural leather is its good heat insulating capacity. This property is hitherto not possessed to the desired degree by synthetic leather substitute material.

The unsatisfactory heat insulating capacity of synthetic leather substitute material based on known chemically bonded fiber fleeces is above all attributable to the deposition of the binder in the fleece in a compact form in the relatively few, relatively large, cavities in the fleece. These fleeces therefore have a small internal surface area. Very rapid heat transportation takes place via the compact polymer regions which are bonded to one another. In wear, the cavities, capillaries and pores in the fleece are filled with water after a relatively short time and do not contribute to the heat insulating effect of the fleece.

Under the usual coagulation conditions, the internal surface of the polymeric binder coagulated in the fleece varies only slightly about a certain average value. It is not possible significantly to increase the internal surface of the polymeric binder deposited in the fleece through changing the coagulation conditions.

The present invention provides a process for the manufacture of a chemically bonded non-woven fiber material in sheet form, wherein there is incorporated with the base material a binder liquid containing in an aqueous medium, in solution or dispersion, a synthetic thermoplastic elastomer, a soluble filler, i.e. a salt which does not affect the ease of coagulation of the dispersed elastomer and/or hexamethylenetetramine, a hydrophilic chemical substance with free OH groups, a reactive fat-like (hydrophobic) compound with 10 to 24 carbon atoms in the molecular chain and a crosslinking agent, the base material is freed from excess of binder liquid and the retained polymeric binder is coagulated by heat, the resulting material is dried and thereafter subjected to a heat treatment at a temperature in the range of 100° to 180°C for a period in the range of 30 seconds to 45 minutes, and the then resulting material is thoroughly washed with a wash liquid and thereafter dried by heating.

The specified component combination of the binder liquid leads, in the course of the process steps, to the deposition of the binder in a finely porous three-dimensional structure containing capillaries, this structure, resulting from chemical reaction with the components contained in the binder liquid, giving rise both to a high water vapor absorbency and to good heat insulating properties.

As the most important prerequisite for good heat insulating properties of the product, the chemical binder contained therein must be distributed as uniformly as possible in the fleece and must have such a structure that it possesses a relatively large internal surface.

As a result of the use, according to the invention, of binder liquid which contains soluble filler, which after coagulation of the polymer is easily washed out from the fleece, it is possible to incorporate the polymeric binder in the fleece so as to form a relatively large internal surface, having an optimum structure, i.e., a structure containing multiple cavities. At the same time it is essential that the dissolved filler should not interfere with the dispersed polymer system nor adversely influence the course of the coagulation of the polymer, and that it should not react chemically with any of the other components present in the binder liquid during the process.

As a result of the use in conjunction of hydrophilic compounds and crosslinking agents in the binder liquid, hydrophilic compounds deposit on the surface of the pores or capillaries formed in the binder by washing out the soluble filler from the binder, and these hydrophilic compounds are firmly bonded to the binder in the course of the process through crosslinking. The finely porous binder distributed in the fleece, in which binder the surfaces of the pores or capillaries are covered, by cross-linking, with compounds which possess hydrophilic groups, imparts a high water vapor absorbency. The finely porous or capillary structure of the binder in the fleece however contributes only to its heat insulating capacity so long as the pores or capillaries in the binder are not filled with liquid. This condition is prevented by the fact that the binder liquid contains fat-like chemical substances capable of chemical reaction, which in the course of the process crosslink with a proportion of the hydrophilic compounds.

The fat-like crosslinking substances at the same time have the effect of a built-in plasticizer. The crosslinking of the fat-like substances with the hydrophilic compounds however does not by itself suffice to render the latter insoluble. For this reason, the binder liquid must contain additional components which are capable of chemical reaction with the hydrophilic compounds. In particular, water-soluble aminoplast precondensates act as additional crosslinking components in the binder liquid.

Up to a certain amount of the soluble filler added to the binder liquid, the internal surface area of the binder deposited in the fleece after coagulation of the polymer increases. On exceeding an upper limit, however, the internal surface in the binder again decreases. The pores and capillaries in the binder become too large.

Up to this maximum amount of filler, a parallel increase in the hydrophilic substances is also necessary for uniform covering of the pore surfaces. Accompanying this, an increase in the amount of the crosslinking agent is necessary in order to crosslink the hydrophilic compounds on the pore surface of the binder in such a way that they become completely insoluble and are not removed from the fleece in the course of the further process steps. The amount of crosslinking agent and also the amount of reactive fat-like components, should be so selected that good crosslinking is ensured and should not be so large that blockage, towards water absorption, of an unnecessarily large number of hydrophilic groups takes place by condensation. The suitable amount of soluble filler in the binder liquid is easily determined in individual cases by simple preliminary experiments.

The total solids content of the binder liquid added to the fleece should amount to at least 30 percent by weight relative to the total weight of the liquid.

Suitable chemical binders in the binder liquid are synthetic elastomers with reactive groups, especially $COOH$ and/or $CONH_2$ and/or $-CO-N(CH_2OH)_2$ groups.

Particularly suitable synthetic polymers are synthetic rubbers with reactive groups, for example copolymers based on butadiene-acrylonitrile-methacrylic acid.

Other preferred synthetic elastomers with reactive groups are those based on acrylic polymers, especially acrylic polymers which consist of 3 or 4 chemically different acrylic compounds. At the same time it is essential that the copolymers mentioned should consist to the extent of at least 5 percent, and at most 25 percent, of acrylic compounds with free groups capable of reaction. Butyl acrylate is preferred as the main constituent of the copolymers.

Mixtures of copolymers of the type mentioned also can be used in a dispersed form.

A particularly preferred copolymer consists of approximately 92 percent by weight of butyl acrylate, approximately 4 percent by weight of methacrylic acid and approximately 4 percent by weight of acrylamide.

Another preferred copolymer consists of approximately 86 percent by weight of butyl acrylate, approximately 4 percent by weight of itaconic acid, approximately 8 percent by weight of dimethylol-methacrylamide and approximately 2 percent by weight of methacrylic acid.

A preferred elastomer is a copolymer of approximately 64 percent by weight of butadiene, approximately 32 percent by weight of acrylonitrile and approximately 4 percent by weight of methacrylic acid.

The polymeric binder is present in the binder liquid so as to constitute a proportion in the range of 20 to 60 percent by weight, relative to the total weight of the binder liquid.

To prepare the binder liquid, an aqueous polymer dispersion is used which has a polymer solids content in the range of 40 to 65 percent by weight, preferably 50 percent by weight, relative to the total weight of the dispersion. The binder liquid contains soluble filler in the range of 20 to 110 percent by weight relative to the weight of the polymeric binder in the binder liquid. In particular it is advantageous if the binder liquid contains a proportion of soluble filler in the range of 30 to 70 percent by weight relative to the solid weight of the polymeric binder in the binder liquid. The filler is added to the aqueous polymer dispersion in the form of a saturated aqueous solution.

Suitable soluble fillers are ammonium chloride, ammonium carbonate and magnesium chloride, and hexamethylene-tetramine is especially preferred. In spite of using relatively large amounts of these soluble fillers in the binder liquid, the dispersing system is not interfered with.

Suitable hydrophilic components in the binder liquid are cellulose derivatives, sorbitol and pentaerythritol, but polyvinyl alcohol is preferred. Mixtures of different hydrophilic substances also can be used advantageously. The hydrophilic compounds are mixed, in the form of aqueous solutions, with the aqueous polymer dispersion. The binder liquid contains a proportion of hydrophilic components in the range of 5 to 20 percent by weight, preferably 7 to 15 percent by weight, relative to the polymer solids content of the binder liquid.

The aqueous solution of the hydrophilic compound used for the manufacture of the binder liquid has a solids content in the range of 5 to 30 percent by weight relative to the total weight of the aqueous solution of the hydrophilic compound.

The fat-like hydrophobic agents in the binder liquid are chemical compounds with a carbon chain in the range of 10 to 24 carbon atoms, preferably 16 to 22 carbon atoms. It is essential to the invention that the fat-like hydrophobic agents contain groups capable of chemical reaction, ethylene-urea or trimethylol-urea groups being particularly advantageous.

Carboxyl, hydroxyl and amino groups are also suitable as reactive constituents of the fat-like hydrophobic agent.

In particular, octadecyltrimethylol-urea and octadecylethylene-urea are suitable as hydrophobic agents. The hydrophobic agent is present in the binder liquid in an amount in the range of 5 to 10 percent by weight relative to the solids content of the hydrophilic compound in the binder liquid.

The hydrophobic agent is added in the form of an aqueous dispersion to the aqueous polymer dispersion when preparing the binder liquid. Preferably, the added hydrophobic dispersion contains a proportion of 22 percent by weight of hydrophobic agent, relative to the total weight of the hydrophobic dispersion.

The hydrophobic agent is added in the form of an aqueous dispersion to the aqueous polymer dispersion when preparing the binder liquid. Preferably, the added hydrophobic dispersion contains a proportion of 22 percent by weight of hydrophobic agent, relative to the total weight of the hydrophobic dispersion.

The chemical crosslinking component contained in the binder liquid advantageously consists of an aminoplast precondensate. Urea-, ethylene-urea- and melamine-formaldehyde precondensates are particularly suitable. The chemical crosslinking agent is present in the binder liquid in an amount in the range of 10 to 100 percent by weight, preferably in an amount in the range of 20 to 80 percent by weight, relative to the amount of the hydrophilic compound. The crosslinking agents mentioned are added to the aqueous polymer dispersion in the form of an aqueous solution, especially preferably a 50 percent by weight aqueous solution, when preparing the binder liquid.

The binder liquid contains crosslinking catalysts in an amount in the range of 10 to 30 percent by weight relative to the amount of the aminoplast precondensate in the binder liquid.

Suitable crosslinking catalysts are ammonium chloride, magnesium chloride, zinc chloride and zinc nitrate.

The binder liquid is prepared by adding the aqueous dispersions or solutions of the above-mentioned component in suitable amounts to the aqueous polymer dispersion and mixing well. The coagulation of the polymeric binder in the binder liquid is appropriately carried out at a temperature of 30° to 60°C. This is achieved by adding an appropriate amount of a polysiloxane (for example Coagulant WS, referred to below). During coagulation, the polymeric binder which precipitates carries with it the greater part of the modifying constituents of the binder liquid. The proportion of the modifying constituents still contained in solution or dispersion is deposited in a solid form in the binder during the drying process of the fleece which follows the coagulation.

The execution of the process is described below:

A random fiber fleece based on synthetic fibers is impregnated with the binder liquid, for example in a padder and is thereafter freed from excess of binder liquid, for example by squeezing out the fleece in the nip of a pair of rollers.

Thereafter the fleece is subjected to heat, at a temperature in the range of 150° to 180°C, whereby the polymeric binder in the fleece is coagulated. The heat is applied, for example, by irradiating the fleece by means of an infra-red radiator.

In the next process step, the fleece is dried by heat, for example in a drying cabinet, at a temperature of about 100°C. Thereafter the fleece is exposed to a temperature in the range of between 100° and 180°C for a period in the range of 30 seconds to 45 minutes, preferably in the range of 140° to 160°C for a period in the range of 2 to 30 minutes. The last-mentioned heat treatment causes the cross-linking of the reactive components. Drying is effected, for example, by means of hot air in a tenter frame dryer.

Thereafter the fleece is largely freed from soluble filler, emulsifiers and catalysts, for example by subjecting the fleece to an intensive washing process with hot water and subsequently with cold water in a solution drum washing machine. The fleece is subsequently dried at a temperature in the range of 100° to 160°C, for example in a tenter frame dryer. The fleece is hydrophobic, has a soft handle and absorbs between 10 and 22 percent of water vapor. The water vapor absorption is determined in accordance with the following method, which resembles practical conditions:

A fleece sample 10 cm long and 5 cm wide is climatically conditioned for 24 hours at 65 percent relative atmospheric humidity and 20°C and is then weighed. Thereafter the sample is stored for a further 24 hours at 100 percent relative atmospheric humidity and 30°C and is then again weighed.

The difference in weight between the two weighings is calculated as a percentage and quoted as the water vapor absorption.

The materials manufactured according to the process of the invention possess good heat insulating capacity. Thus, footwear made from a synthetic material with leather-like properties, using a fleece bonded according to the invention as the support of the leather substitute material, on wearing gives a feeling of comfort like shoes of natural leather. In addition to use for the manufacture of shoe uppers, the materials may be used for the manufacture of outer garments, handbags, luggage and upholstery.

The following Examples further illustrate the invention:

EXAMPLE 1

A binder liquid is used with 20 percent by weight of soluble filler, relative to the polymer solids content of the binder liquid.

The binder liquid is prepared from the following three liquids by mixing these together as described below.

a. 100g of a 50 percent by weight aqueous copolymer dispersion based on 64 percent by weight of butadiene, 32 percent by weight of acrylonitrile and 4 percent by weight of methacrylic acid (for example "Perbunan" NT of Farbenfabriken Bayer, Germany)

1.5g of a 26 percent by weight aqueous emulsifier solution (for example "Emulvin" W of Farbenfabriken Bayer)

16.5g of water 0.1g of colloidal sulfur 7.15g of a 35 percent by weight aqueous zinc oxide suspension (for example active zinc oxide from Farbenfabriken Bayer)

0.10g of vulcanization accelerator (for example "Vulkazit" LDA of Farbenfabriken Bayer)

0.75g of vulcanization accelerator (for example Vulkazit ZM of Farbenfabriken Bayer)

2.4g of titanium dioxide, and 0.6g of a 40 percent by weight aqueous solution of "Emulvin" W b. 10g of polyvinyl alcohol (for example "Mowiol" N 30 – 88 of Farbwerke Hoechst AG, Germany), dissolved in 60 g of $H_2O$, 1.25g of a 22 percent by weight aqueous dispersion of octadecyltrimethylol-urea (for example "Primenit" CO of Farbwerke Hoechst AG)

1.65g of a 26 percent by weight aqueous solution of Emulvin W 12.5g of $H_2O$ 0.54g of "Melustral" dyestuff, a product of Farbwerke Hoechst AG, and 1.2g of polysiloxane (for example Coagulant WS of Farbenfabriken Bayer)

c. 2g of melamine-formaldehyde precondensate (for example "Cassurit" MLP of Farbwerke Cassella, Frankfurt, Germany)

10g of hexamethylenetetramine 0.6g of magnesium chloride, and 20g of $H_2O$

Liquids b) and c) are successively mixed into liquid a), with good stirring.

A random fiber fleece of 50 percent of polyester fibers and 50 percent of polyamide fibers (staple length 30 mm, titre 1.3 dtex) of density 0.18 $g/cm^3$ is impregnated with the binder liquid in a padder, freed from excess of binder liquid by means of a pair of nip rollers and then subjected to a temperature of 180°C, whereby the dispersed polymer of the binder liquid is coagulated.

Thereafter the fleece is heated for 30 minutes at a temperature of 160°C (Hot Flue). As a result of this heat treatment, it is first dried and then the modifying constituents in the fleece are crosslinked.

The fleece is then thoroughly washed with hot and thereafter with cold water and subsequently dried in a tenter frame dryer at a temperature of 160°C. The content of polymeric binder in the fleece is 52 percent by weight relative to the total weight of the fleece. The fleece has a water vapor absorbency of 10.5 percent.

EXAMPLE 2

Binder liquid with filler; composition of the binder liquid:
a. As described in Example 1.
b. of polyvinyl alcohol (for example Mowiol N 30 – 88), dissolved in 60 g of $H_2O$
 1.14g of a 22 percent by weight aqueous dispersion of octadecylethylene-urea (for example Primenit VS of Farbwerke Hoechst AG)
 1.65g of a 26 percent by weight aqueous solution of Emulvin W
 12.5g of $H_2O$
 1.2g of polysiloxane (for example Coagulant WS).
c. 2g of a melamine-formaldehyde precondensate (for example Cassurit MLP)
 1.25g of urotropine
 0.4g of magnesium chloride, and
 20g of $H_2O$ A random fiber fleece as described in Example 1 is bonded and washed, also as described in Example 1. The binder content is 50 percent by weight.
Water vapor absorption: 12.2 percent

EXAMPLE 3

Binder liquid with 30 percent by weight of soluble filler.
Composition of the binder liquid:
a. As described in Example 1.
b. 10g of polyvinyl alcohol (for example Mowiol N 30 – 88), dissolved in 60 g of $H_2O$
 1.14g of a 22 percent by weight aqueous dispersion of octadecylethylene-urea (for example Primenit VS)
 1.65g of a 26 percent by weight aqueous solution of Emulvin W
 12.5g of $H_2O$
 1.2g of polysiloxane (for example Coagulant WS) and
 0.54g of Melustral dyestuff,
c. 2.5g of a melamine-formaldehyde precondensate (for example Cassurit MLP)
 15g of urotropine
 0.75g of magnesium chloride, and
 25g of $H_2O$ A random fiber fleece as described in Example 1 is bonded and washed, also as described in Example 1. The binder content is 50 percent by weight.
Water vapor absorption: 14 percent.

EXAMPLE 4

Binder liquid with 40 percent by weight of soluble filler.
The binder liquid is prepared by mixing the liquids mentioned under b) and c) into liquid a) and stirring well.
a. As described in Example 1.
b. 10g of polyvinyl alcohol (for example Mowiol N 30 – 88), dissolved in 60 g of $H_2O$
 1.25g of a 22 percent by weight aqueous dispersion of octadecyltrimethylol-urea (for example Primenit CO)
 1.65g of a 26 percent by weight aqueous solution of "Emulvin" W
 12.5g of $H_2O$
 0.54g of Melustral dyestuff, and
 1.2g of polysiloxane (for example Coagulant WS)
c. 4g of melamine-formaldehyde precondensate (for example Cassurit MLP)
 20g of urotropine
 1.6g of magnesium chloride, and
 20g of $H_2O$ A random fiber fleece as described in Example 1 is bonded and washed, also as described in Example 1. The binder content is 50 percent by weight.
Water vapor absorption: 15.2 percent

EXAMPLE 5

Binder liquid with 50 percent by weight of soluble filler.
The binder liquid is prepared by mixing the liquids a) and c) into the liquid b) and stirring well.
a. As described in Example 1.
 6g of polyvinyl alcohol
 78g of $H_2O$
 1.35g of a 22 percent by weight aqueous dispersion of octadecylethylene-urea (for example Primenit VS)
 1.65g of a 26 percent by weight aqueous solution of Emulvin W
 16.5g of $H_2O$, and
 1.5g of polysiloxane (for example Coagulant WS)
c. 7.2g of melamine-formaldehyde precondensate (for example Cassurit MLP)
 1.44g of magnesium chloride
 24g of urotropine, and
 50g of $H_2O$.

A random fiber fleece as described in Example 1 is bonded and washed, as indicated in Example 1.
Binder content of the fleece: 46 percent by weight.
Water vapor absorption: 18.5 percent

EXAMPLE 6

Binder liquid with 60 percent by weight of soluble filler.
The binder liquid is prepared by mixing the liquids b) and c) into the liquid a) and stirring well.
a. As described in Example 1.
b. 7.5g of polyvinyl alcohol
 90g of $H_2O$
 3.31g of a 22 percent by weight aqueous dispersion of octadecylethylene-urea (for example Primenit VS)
 1.65g of a 26 percent by weight aqueous solution of Emulvin W
 1.5g of $H_2O$, and
 16.5g of polysiloxane (for example Coagulant WS)
c. 11.24g of melamine-formaldehyde precondensate (for example Cassurit MLP)
 2.25g of magnesium chloride
 30g of urotropine, and
 50g of $H_2O$.

A random fiber fleece as indicated under Example 1 is bonded and washed, as described in Example 1.
Binder content: 45 percent by weight.
Water vapor absorption: 22.5 percent

EXAMPLE 7

Binder liquid with 20 percent by weight of soluble filler (as in Example 1).
The binder liquid is prepared by mixing liquids a), b) and c), the liquids b) and c) having the same composition as in Example 1 while the liquid a) has the following composition:

100g of a 50 percent by weight aqueous copolymer dispersion based on approximately 86 percent by weight of butyl acrylate, approximately 4 percent by weight of itaconic acid, approximately 8 percent by weight of dimethylolmethacrylamide and approximately 2 percent by weight of methacrylic acid 3g of a 26 percent by weight aqueous emulsifier solution (for example Emulvin W)

2.5g of titanium dioxide, and 1.5g of a 40 percent by weight aqueous solution of Emulvin W.

Liquids b) and c) are successively mixed into liquid a), with good stirring.

A random fiber fleece is used corresponding to that indicated in Example 1. The remaining process conditions are as stated in Example 1.

EXAMPLE 8

Binder liquid with 20 percent by weight of soluble filler (as in Example 1).

The binder liquid is prepared by mixing liquids a), b) and c), the liquids b) and c) having the same composition as in Example 1 while the liquid a) has the following composition:

100g of a 48 percent by weight aqueous acrylate copolymer dispersion (for example Acralen AFR of Farbenfabriken Bayer)

3g of a 26 percent by weight aqueous emulsifier solution (for example Emulvin W)

2.5g of titanium dioxide, and 1.5g of a 40 percent by weight aqueous solution of Emulvin W.

The liquids b) and c) are successively mixed into the liquid a) with good stirring.

The random fiber fleece used is similar to that indicated in Example 1. The remaining process conditions are as stated in Example 1.

It will be obvious to those skilled in the art that many modifications may be made within the scope of the present invention without departing from the spirit thereof, and the invention includes all such modifications.

What is claimed is:

1. A process for the manufacture of chemically bonded non-woven fiber material in sheet form, in which a polymer material in the form of a solution or dispersion is incorporated in the base material and the polymer material is coagulated, which comprises impregnating the fiber material with a liquid binder system containing
   a. an aqueous dispersion of a synthetic thermoplastic elastomer,
   b. an aqueous solution of a water-soluble filler selected from the group consisting of hexamethylenetetramine, ammonium chloride, ammonium carbonate, magnesium chloride and mixtures thereof, in an amount of 20 to 110 percent by weight of the solids content of said elastomer,
   c. an aqueous solution of at least one hydrophilic compound, in an amount of 5 to 20 percent by weight of the solids content of said elastomer,
   d. an aqueous dispersion of a fat-like, hydrophobic compound having a carbon chain in the range of 10 to 24 carbon atoms and containing reactive groups selected from the group consisting of ethyleneurea, trimethylol urea, carboxyl, hydroxyl and amino groups, in an amount of 5 to 10 percent by weight of said hydrophilic compound,
   e. an aqueous solution of an aminoplast precondensate crosslinking component, in an amount of 10 to 100 percent by weight of said hydrophilic component and
   f. an inorganic cross-linking catalyst, heating said impregnated fiber material to the coagulation temperature of said elastomer, heating said impregnated fiber material to a temperature of 100° to 180°C for a period of 30 seconds to 45 minutes to cross-link the cross-linkable components of said system, washing said impregnated fiber material with water to remove said filler and drying said impregnated fiber material.

2. A process according to claim 1 wherein as the soluble filler the binder liquid contains ammonium chloride, ammonium carbonate or magnesium chloride.

3. A process according to claim 1 wherein as the hydrophilic component the binder liquid contains a cellulose derivative, sorbitol or pentaerythritol.

4. A process according to claim 1 wherein as the hydrophilic component the binder liquid contains polyvinyl alcohol.

5. A process according to claim 1 wherein as the fat-like compound the binder liquid contains octadecyl-trimethylol-urea.

6. A process according to claim 1 wherein as the fat-like compound the binder liquid contains octadecyl-ethylene-urea.

7. A process according to claim 1 wherein the aminoplast precondensate is a urea-, ethyleneurea- or melamine-formaldehyde precondensate.

8. A process according to claim 1 wherein an elastomer dispersion employed for the preparation of the binder liquid contains 40 to 65 percent by weight of elastomer.

9. A process according to claim 1, wherein the binder liquid contains the soluble filler in a range of 30 to 70 percent by weight, relative to the weight of the polymeric binder.

10. A chemically bonded non-woven fiber material in sheet form, when made by the process claimed in claim 1.

11. A process according to claim 1 wherein the elastomer of the binder liquid is a synthetic rubber with reactive groups.

12. A process according to claim 11 wherein the synthetic rubber is a copolymer based on butadiene-acrylonitrile-methacrylic acid.

13. A process according to claim 6 wherein the copolymer contains approximately 64 percent by weight of butadiene, approximately 32 percent by weight of acrylonitrile and approximately 4 percent by weight of methacrylic acid.

14. A process according to claim 1 wherein the elastomer of the binder liquid is an acrylic polymer with reactive groups.

15. A process according to claim 8 wherein the acrylic polymer is formed from approximately 92 percent by weight of butyl acrylate, approximately 4 percent by weight of methacrylic acid and approximately 4 percent by weight of acrylamide.

16. A process according to claim 14 wherein the acrylic polymer is a copolymer of approximately 86 percent by weight of butyl acrylate, approximately 4 percent by weight of itaconic acid, approximately 8 percent by weight of dimethylolmethacrylamide and approximately 2 percent by weight of methacrylic acid.

* * * * *

UNITED STATES PATENT OFFICE
CERTIFICATE OF CORRECTION

PATENT NO. : 3,920,868

DATED : November 18, 1975

INVENTOR(S) : Klaus Hammer, Herbert Porrmann and Jürgen Lucas

It is certified that error appears in the above-identified patent and that said Letters Patent are hereby corrected as shown below:

Column 7, line 21, "1.25" should read - - - 12.5 - - -.

Column 10, line 52, "claim 6" should read - - - claim 12 - - -.

Column 10, line 60, "claim 8" should read - - - claim 14 - - -.

Signed and Sealed this seventeenth Day of February 1976

[SEAL]

Attest:

RUTH C. MASON
Attesting Officer

C. MARSHALL DANN
Commissioner of Patents and Trademarks